United States Patent [19]
Reuter et al.

[11] 3,875,463
[45] Apr. 1, 1975

[54] MOTOR PROTECTION CIRCUIT AND AUTOMATIC RESTART CONTROL SYSTEM

[75] Inventors: William L. Reuter, Rapid City, S. Dak.; Allen P. Schmidt, Edina, Minn.

[73] Assignee: Dunham Associates, Inc., Rapid City, S. Dak.

[22] Filed: Mar. 14, 1974

[21] Appl. No.: 450,998

[52] U.S. Cl.............. 317/13 R, 307/127, 317/22, 317/27 R, 317/31, 317/36 TD, 317/48
[51] Int. Cl. ............................................. H02h 7/09
[58] Field of Search...... 317/13 R, 22, 23, 31, 27 R, 317/46, 47, 48, 36 TD; 307/127

[56] References Cited
UNITED STATES PATENTS

| | | | |
|---|---|---|---|
| 2,975,334 | 3/1961 | Callan | 317/48 |
| 3,584,259 | 6/1971 | Traub et al. | 317/31 |
| 3,783,354 | 1/1974 | Fletcher et al. | 307/127 X |

*Primary Examiner*—James D. Trammell
*Attorney, Agent, or Firm*—Merchant, Gould, Smith & Edell

[57] ABSTRACT

Excitation voltages applied to an electric motor or other loads are monitored to guard against excessive voltage, insufficient voltage, and voltage imbalance, which includes single phasing, independent of the phase or combination of phases on which they occur by positive and negative sequence symmetrical component analyzers having voltage responsive switching means associated with their outputs. Logic and control circuits disconnect the motor from the line when an out-of-tolerance condition exists, and provide automatic restart of the motor when the power lines return to normal. Hysteresis is built into the logic and control circuit to prevent pumping or control cycling, and time delays prevent nuisance tripping. A residual motor voltage sensing circuit prevents reconnection if the motor is rotating and generating sufficient residual voltage to cause damage by phasing mismatch between the residual and applied voltages. A lockout counter, which in one embodiment inncorporates thermal time delay relays, prevents further restart attempts for a period of time if a predetermined number of restarts have been made within a predetermined time interval.

13 Claims, 3 Drawing Figures

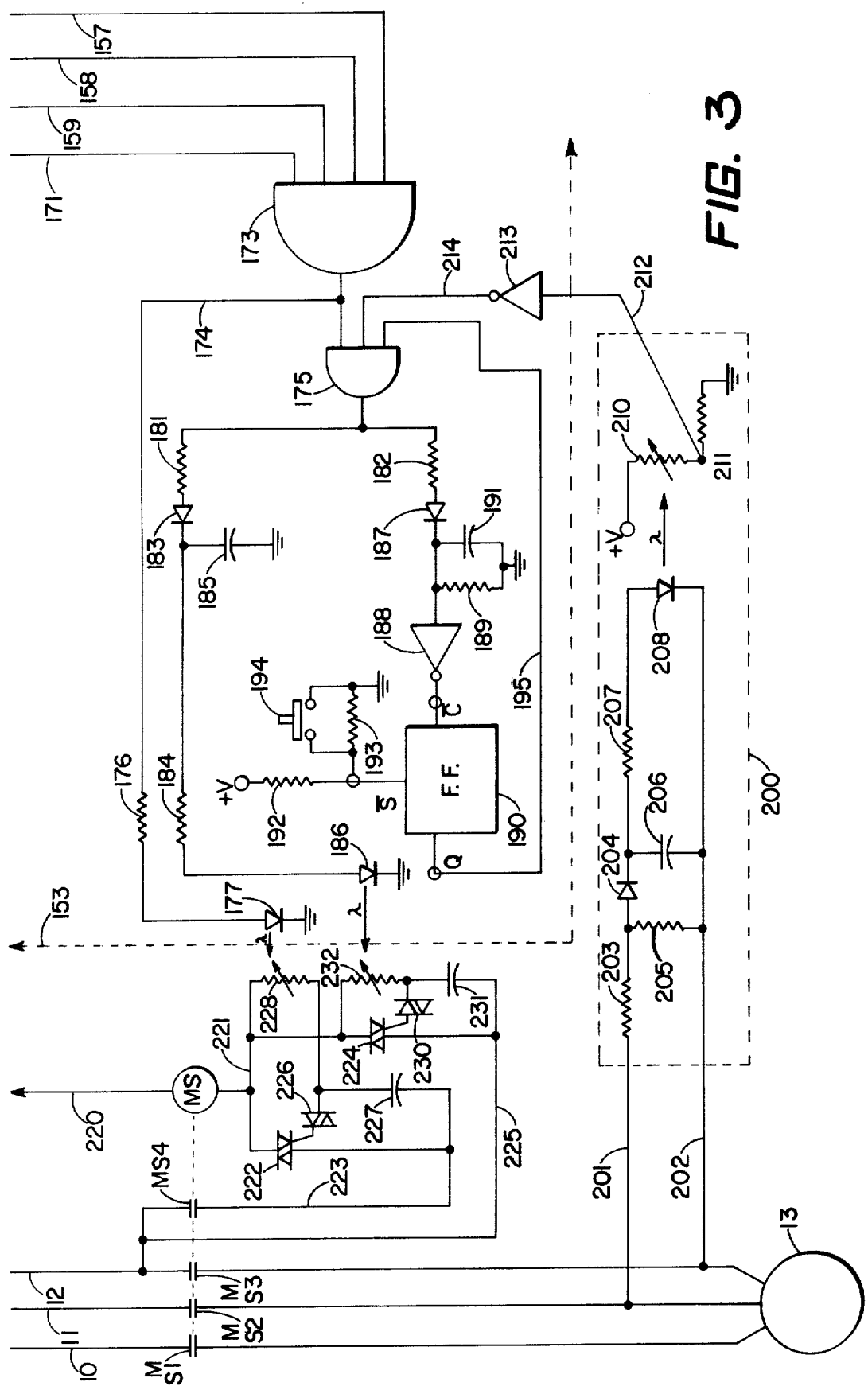

MOTOR PROTECTION CIRCUIT AND AUTOMATIC RESTART CONTROL SYSTEM

BACKGROUND OF THE INVENTION

The present invention pertains generally to the field of electrical monitoring and protection circuits, and more particularly to the field of automatic monitoring and control systems for disconnecting an electric motor or other load from the power lines should the line voltages deviate beyond certain tolerable limits, and for automatically restarting the motor after the line voltages have returned to acceptable limits and have stabilized.

Because of the substantial and expensive damages that can result to an electric motor which is kept connected to the line during out-of-tolerance excitation voltages, numerous automatic motor protection systems have been proposed in the prior art. A vast number of individual circuit configurations, operating upon varied sensing and control principles have been developed to fit individual applications. Although great variety does exist in the prior art monitoring circuits, most of them operate by measuring one or more characteristics of the applied power, comparing the measured quantity against a predetermined standard, and disconnecting the motor via a relay or other switch if a fault is detected.

As the art has developed, simpler systems which may, for example, measure only averaged input voltage or current, have given way to more sophisticated monitoring systems which sense more and varied characteristics of the power supply and operating conditions of the motor independent of the phase or combination of phases on which they occur, and provide predetermined corrective actions to protect the load in response to a variety of out-of-tolerance conditions. Obviously, the more sophisticated and flexible types of monitoring provide better protection for the load, since they are able to guard against a number of conditions or combinations of conditions which might be harmful to the load, but which may not be detected by simpler averaging type measurement circuits.

Heretofore, these more sophisticated monitoring and control systems have been used only for the protection of the larger and more expensive motors and other loads, because the greater expense and bulk of these controls prohibited installation for the protection of a great number of lower cost motors. A need still exists, however, for a high performance automatic restart control system having full motor protection capability, that is low enough and small enough in size for use with medium and lower priced motor installations.

One reason the more elaborate and expensive systems have not been used with smaller motor installations is that it was thought that the small probability of damage times the cost of the motor did not justify the cost of the monitoring system. The increasing prospect of voltage supply reductions or "brownouts" poses a new risk to unprotected motors, for example, in medium sized air conditioning installations.

SUMMARY OF THE INVENTION

According to the present invention there is provided a monitoring system having improved motor protection and automatic restart control which provides a more complete abd highly reliable protection of the motor or other load against a wide variety of power fault conditions, or combinations thereof. This superior performance is achieved at a lower cost and with a physically smaller size than has heretofore been achieved. In the preferred embodiment, symmetrical component sequence analyzers are used for monitoring the three-phase power line voltages so that tripping is independent of phases or combinations of phases on which an abnormal condition may occur. In other words, the type of condition is important and not the phase on which it occurs. One such analyzer is connected for measuring the positive sequence symmetrical component, and a second analyzer is connected for measuring the negative sequence symmetrical component. Voltage responsive switching devices connected to the outputs of these analyzers provide indications of insufficient or excessive positive-sequence component and excessive negative-sequence component. If an overvoltage or undervoltage condition should occur, or if a voltage imbalance among the phases, loss of one or more phases, or reverse sequence should occur, these conditions will show up as a change in the output of the positive and/or negative sequence symmetrical components. Logic and control means are provided for disconnecting the motor after appropriate time delays in response to switching of the voltage responsive means. Means are provided for including a degree of hysteresis in the control circuit to prevent control cycling which might otherwise be caused by reconnecting the motor when the applied voltages are marginal, and the transients from reconnecting the motor could disturb the input voltages enough to cause immediate disconnection.

According to another feature of the present invention, a residual motor voltage sensing circuit is provided for indicating to the logic and control means the situation which occurs when the motor has been disconnected, but has not yet slowed down and is therefore generating an output voltage of its own. The logic and control means is adapted for preventing re-engagement of the motor to the power lines while a significant residual voltage is present, to prevent the possiblity of re-engagement with a probable phasing mismatch between the residual voltage of the motor and the voltage of the power line.

According to yet another feature of the present invention, a restart counter is provided to limit the number of starting attempts within a predetermined time period. In case of a defective motor or wiring component on the motor side of the disconnect relay, or in the case of a recurring power line fault, the possibility of repeated restart-disconnect cycles occurs. Since the current drawn by a motor during starting may be several times the running current of the motor, overheating and damage to the motor may result. To guard against this possibility, the restart counter locks out the engage means after a predetermined number of starts have occurred within a given time period. In one embodiment, a thermally insulated time delay generates a certain amount of heat on each restart attempt. If the temperature therein reaches a predetermined level, the relay causes lockout of the system. In another embodiment, an electronic integrator circuit charges during a starting operation. If too many starts have been attempted in a short interval of time, the voltage build-up in the integrator triggers a lockout circuit which prevents further restart attempts until manually reset by an operator.

In the preferred embodiments, high performance and low cost and weight is achieved through the use of special inductorless, transformerless symmetrical component sequence analyzers.

Embodiments of the present invention incorporating relay logic and electronic logic are disclosed. Further reductions in cost and improvements in reliability can be achieved in the case of the electronic embodiment by fabricating the logic and control circuitry on a single integrated circuit chip. A major portion of the remaining circuitry would be fabricated on another chip. The two chips and remaining components would then be mounted on a printed circuit board, resulting in a complete device that is quickly and easily manufactured, and which has very high reliability.

BRIEF DESCRIPTION OF THE DRAWINGS

In the drawing.

FIG. 3 is a continuation of the circuit shown in FIG. 2.

DESCRIPTION OF THE PREFERRED EMBODIMENTS

Figure 1:
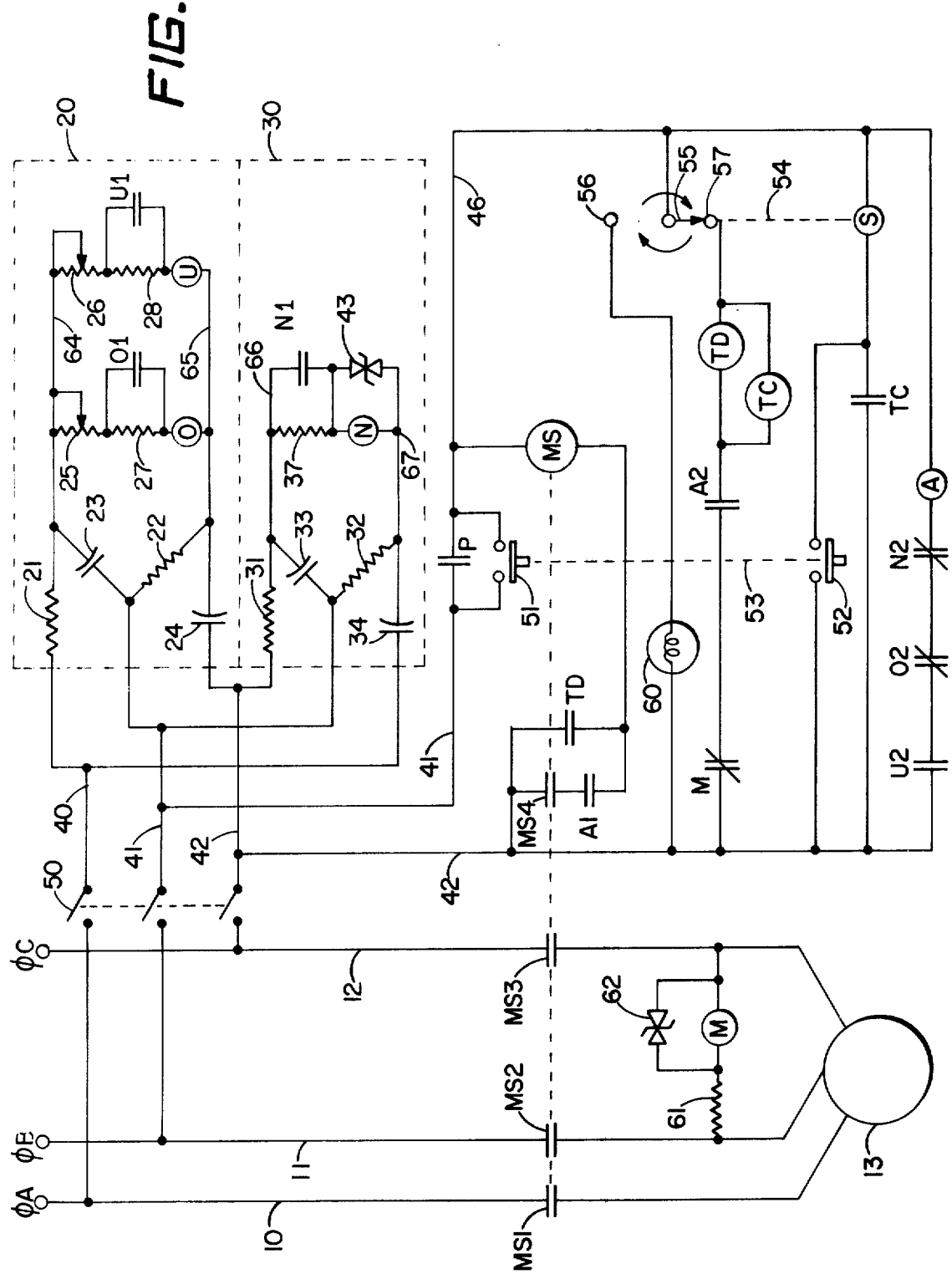
FIG. 1 is a schematic diagram of a motor protection and automatic restart circuit implemented with relay logic.

In FIG. 1, reference numerals 10, 11 and 12 designate a three-phase power line for conveying three-phase power from a source (not shown) to the load, which in FIG. 1 is three-phase motor 13. A set of relay contacts MS serve to connect motor 13 to the power line. Power line 10 is connected to phase A, line 11 to phase B, and line 12 to phase C of the three-phase source, whose phase sequence is ABC.

The circuitry within dotted line 20 generally is the positive sequence symmetrical component analyzer. This analyzer comprises resistors 21 and 22, capacitors 23 and 24, and an output or load resistance represented by the combination of variable resistors 25 and 26, resistors 27 and 28 (if not switched out of the circuit) and the resistance represented by the coils of relay drivers O and U. Although any type of prior art symmetrical component sequence analyzer providing an output voltage indicative of the symmetrical component could be used in the place of circuit 20, the preferred embodiment uses the four element inductorless analyzer shown in FIG. 1. This analyzer is described in greater detail in copending patent application Serial No. 451,115, which is assigned to the same assignee of this application. The circuit within dotted line 30 is a negative sequence analyzer. Except for the output load comprising resistor 37 and relay driver N, sequence analyzer 30 is identical in structure to sequence analyzer 20, although component values may differ. Resistors 31 and 32, and capacitors 33 and 34 may be connected in the same manner as their counterparts in circuit 20. Lead 40 conveys phase A from line 12, through on/off switch 50 to circuits 20 and 30. Similarly, leads 41 and 42 convey phases B and C, respectively. Phases A and C are interchanged in their connections to circuits 20 and 30, so that circuit 20 measures the positive sequence while circuit 30 measures the reverse sequence. In other words, while lead 40 conveys phase A to resistor 21 of circuit 20, it supplies phase A to capacitor 34 of circuit 30 and lead 42 supplies phase C to resistor 31 of circuit 30 and to capacitor 24 of circuit 20.

In circuit 20, a pair of normally open relay contacts O1 are connected in parallel around resistor 27. Relay contacts O1 are operated by delay relay driver O. Similarly, a pair of normally open relay contacts U1 are connected in parallel around resistor 28, and are operated by delay relay driver U. In circuit 30, a pair of normally open relay contacts N1 are connected in parallel around resistor 37 and are operated by delay relay driver N. A voltage limiting device 43 which may be a pair of zener diodes is connected in parallel with relay driver N.

Phases B and C of the power source are arbitrarily chosen for operating the relay logic described in the following paragraphs. These phases are supplied through leads 41 and 42 respectively. A pair of control contacts P connect from lead 41 to lead 46. A manually operated switch 51 is connected in parallel with contact P. A relay driver MS connects from lead 46 through relay contact A1 and MS4 which are connected in series. A normally open relay contact TD also connects from lead 42 to relay driver MS. A driver S of a two position stepping relay is connected from lead 46, through relay contacts TC to lead 42. Relay driver S also connects to lead 42 through manual switch 52, which is mechanically linked to switch 51 as indicated by broken line 53. As indicated by broken line 54, driver S operates to step wiper contact 55 between two positions 56 and 57. Wiper arm 55 is connected to lead 46, and contact 56 connects through a signal lamp 60 to lead 42. Contact 57 connects through the parallel connection of relay drivers TD and TC, through relay contacts A2 and normally closed relay contacts M to lead 42. Relay driver TD provides the starting delay, and TC is the thermally insulated counter relay, whose function is described in a subsequent paragraph. A relay driver A is connected from lead 46 through normally closed relay contacts N2 and O2, and normally open relay contacts U2 to lead 42.

A resistor 61 and a relay driver M are connected in series between two of the power lines, on the motor side of the MS, or motor starting contacts. As shown in FIG. 1, these components are connected between the B and C phases, from contacts MS2 to MS3. However, any two pair of leads would work. A voltage limiting device, which may be a series pair of zener diodes is connected across relay driver M.

Operation of the Embodiment of FIG. 1.

To energize the system, manual switch 50 is turned on thereby applying the three phase power to sequence analyzers 20 and 30. These analyzer circuits function to provide at their outputs, across lead 64 and 65 for circuit 20 and leads 66 and 67 for circuit 30, a voltage signal having a magnitude proportional to the magnitude of the corresponding symmetrical component signal. The magnitude of the voltage of course depends not only on the magnitude of the positive and negative component signals present on the power lines, but also upon the choice of component values in the analyzer circuits, as explained in the abovementioned copending application. The switching current or voltage of relay driver O is selected, in conjunction with the resistance value 25 so that it does not pull in its contacts until a predetermined positive-sequence symmetrical component overvoltage condition exists. Relay driver U is selected in conjunction with resistance 26 so that its contacts normally are energized, and remain energized unless the magnitude of the positive-sequence symmetrical component drops below a predetermined value. Relay driver N and resistor 37 are designed so that relay N is energized only if the negative-sequence symmetrical component exceeds a predetermined value. Ideally, the negative-sequence symmetrical component will be near zero and relay N will be unenergized. However, should an imbalance condition, or loss of a phase occur, this will show up as a great increase in the negative component, and relay N is designed to pull in at the appropriate threshhold to protect the motor.

Assuming that the input voltages are within tolerance, relay U will be energized, and relays O and N will be effectively unenergized. The motor is now ready to start, pending the closing of contacts P which may be pilot starting contacts at some remote point. Pilot contacts P may be another manual switch, or may be under the control of some process variable, such as a thermostat, associated with the apparatus being operated by motor 13.. Once contacts P are closed, power is supplied to lead 46 completing the circuit through relay driver A, which closes contacts A1 and A2. Closing of contacts A2 energizes relay driver TD, after the starting time delay of a predetermined number of seconds. The purpose of this time delay is to provide for sequential starting for multiple motors on a common branch circuit after conditions return to normal. Although voltage is simultaneously applied to relay TC, it does not energize because of its greater time delay, as is explained hereafter. Closing of contacts TD applies power to relay driver MS which applies the three phase power line to motor 13, and also closes sealing contacts, or latching contacts MS4. As the motor starts, voltage is applied through driver M which opens contacts M, interrupting the flow of power to relay drivers TD and TC. Contacts TC then open, but the motor starting relay MS remains energized, through the action of sealing contacts MS4.

Once the machine is running, should a fault occur, either relay U will drop out, or else relays O or N will pull-in. Assume, for example, that a general decrease in the applied voltages occurs, such as in a "brownout." When the voltage drops to a predetermined threshold for a sufficient period of time, determined in consideration of the safe operating parameters for motor 13 and designed into the characteristics of relay U, relay U will drop out, opening contacts U2, which de-energizes relay A which causes the motor starting relay MS to drop out, thus protecting the motor from the danger of drawing excessive currents and overheating. At the same time, contacts U1, which had been closed shorting out resistor 28, open placing resistor 28 in series with relay driver U. This feature provides a built-in hysteresis effect, so that in order to restart the motor, the voltage must climb to a value higher, preferably five per cent or so, than the value at which relay U dropped out. This hysteresis effect serves to prevent pumping or control cycling, and resistor 28 is accordingly referred to as an antipumping resistor. Pumping could otherwise occur where the input voltage to the motor sagged to just below the value required to keep relay U pulled in. However, as soon as relay U caused a disconnection of the motor, the removal of the load represented by the motor from the power line would cause the voltage to increase silghtly, enough for relay U to pull back in. But reconnection of motor 13 would drop the voltages again causing the control cycling. This action is prevented by resistor 28, which requires that the voltages must climb above a certain safety margin before the motor will be reconnected. Resistor 26 is used to adjust the threshold for different applications or to adjust for tolerances in the pull-in characteristic of the relay used at U.

Assume that an unbalanced condition occurred, or that one of the phases went dead. If the motor were unprotected, this could result in drawing excessive currents from the other two phases, which would lead to overheating. The out-of-balance voltages, however, result in a non-zero negative-sequence symmetrical component, which is detected by circuit 30. When this value becomes and remains excessive for a predetermined period of time, as determined by the characteristics of motor 13, and designed into the characteristics of relay N, relay N pulls in, opening relay contacts N2 and disconnecting the motor. Again, contacts N1 close shorting out resistor 37, so that the offending negative-sequence symmetrical component must drop below the pull-in threshold before relay N drops out and allows the motor to restart.

In the case of incorrect phasing, if leads 10, 11 and 12 were somehow interchanged or under certain fault conditions with capacitor bank power factor correction, an extremely high negative-sequence component would appear across leads 66–67, thereby energizing relay N. In such case, voltage protecting device 43 would limit the voltage across relay N to keep it from burning out.

In the case of an overvoltage condition, relay O would be energized, opening contacts O2 to disconnect the machine, and closing contacts O1 to provide another built-in hysteresis. The switching threshold for relay O can be adjusted by variable resistor 25.

Should any of the conditions discussed above occur, motor 13 is disconnected. Upon correction of the conditions noted above, relays O, U and N return to normal condition, allowing restart of the motor after a predetermined time delay, subject to limitations imposed by the residual voltage detector and the restart lockout counter. Assume that disconnect has just occurred, but that motor 13 is still turning, and therefore producing a back EMF which keeps relay M energized. Relay M will remain energized until the back EMF drops below a predetermined value. The voltage at which relay M will drop out is selected by resistor 61. Of course, voltage protection device 62 is to protect relay driver M from the high voltages across the motor leads during normal operation.

As long as relay M remains energized, contacts M are open, preventing energization of relay TD, which of course is necessary to start the motor. When the voltage across the windings of motor 13 drops to a low enough value, which may take a second or two, relay M drops out, thereby closing contacts M to enable relay TD, assuming that the conditions for energization of relay A are all satisfied.

The lockout counter operates as follows. The thermal time delay TC is chosen to have slightly larger heating and cooling time constants than relay TD. This can be achieved by selecting TC with a larger time delay than TD and by providing a thermal insulating cap for relay TC so that it cools at a slower rate than TD. The other major component of this subsystem is the stepping relay S. In the description thus far it has been assumed that wiper contact 55 is in the position shown in FIG. 1. Each time that relay driver S is energized, wiper contact 55 moves to its alternate position, that is to contact 56, then to 57 again on the next impulse, etc.

Each time the starting cycle is initiated, both relays TD and TC are energized and their internal temperatures start to increase. On the first start, after both relays have been at ambient temperature, relay TD will close its contacts thereby starting the motor before contact TC has warmed up enough to close contacts TC and energize the stepping relay S. After the motor is energized, the motor voltage relay M disconnects TD and TC, allowing them to start to cool towards ambient temperature. Because of the insulating cap on relay TC, it cools at a slower rate. Consequently, if the motor is disconnected and if the starting cycle is reinitiated before TC can cool appreciably, TC will be at a higher internal temperature than TC when they are re-energized. If the internal temperature of relay TC is high enough, TC will close its contacts before TD and will therefore energize the stepping relay. This will move the wiper arm 55 to contact 56, thereby disconnecting TD and preventing motor starting. At the same time, it completes a circuit through lamp 60, which may be on a control panel, to indicate that lockout has occurred.

It will be seen that if the motor is attempted to be restarted too often in too short a time interval, lockout will occur. For example, relay TC and its insulating cap can be designed to lockout the system if the motor tries to start, for example, two times in less than 2 minutes, or three times in less than 5 minutes. It will be apparent that the action of the lockout counter also serves to stop any pumping action. If a fault is on the motor side of contacts MS, pumping could occur, but will be stopped after a few cycles by the lockout counter. To reset the lockout counter, it is necessary to actuate manual switch 51 and 52. This applies current to the stepping motor S to reset the stepping switch. The embodiment shown in FIG. 1 senses the line voltages on the line side of the motor starting/disconnect contacts MS1-MS3. It will be appreciated that leads 40–42 could be connected on the motor side of contacts MS. In this case, identical monitoring and disconnect action would occur, but restarting of course, would have to be manually initiated.

Figure 2:
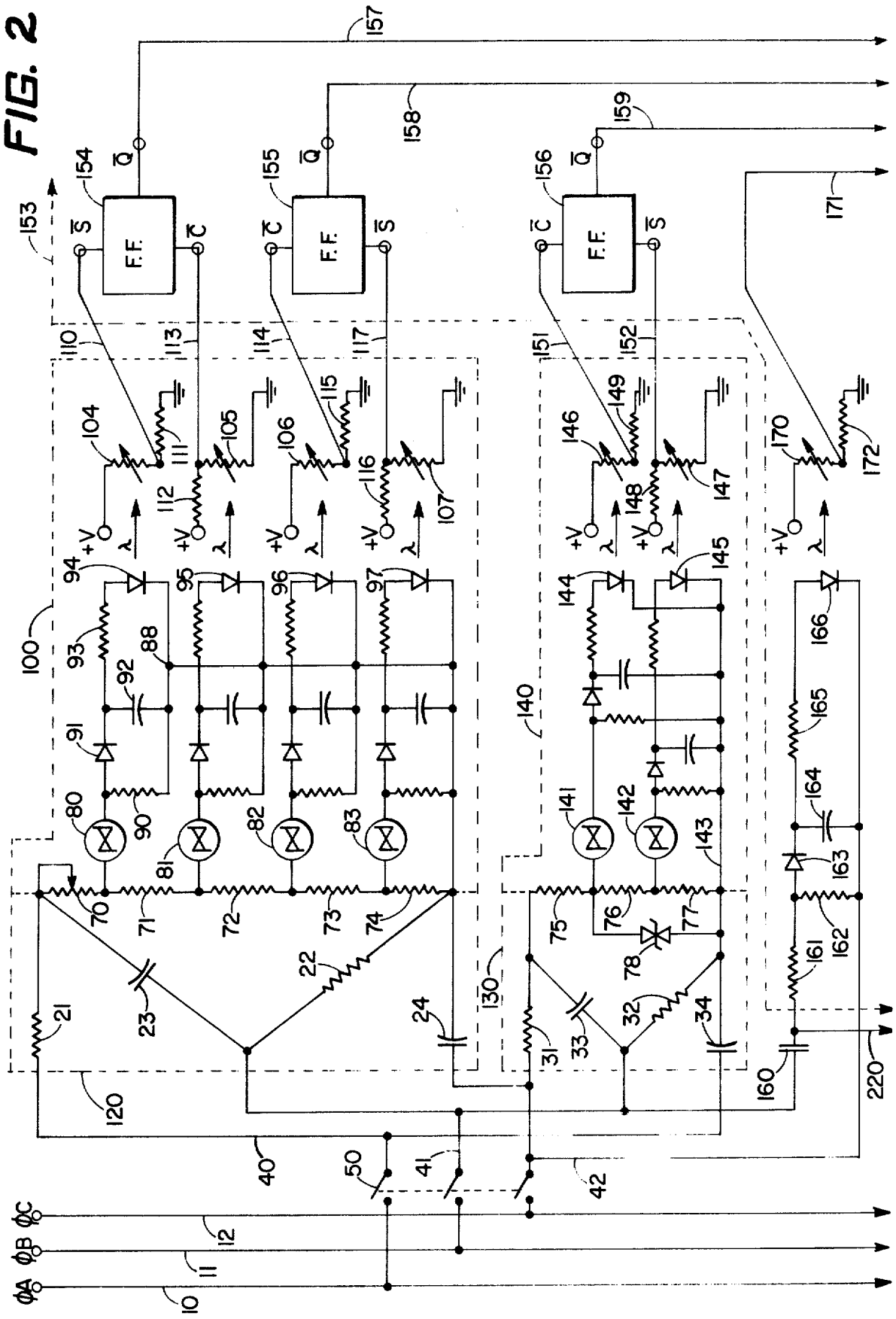
FIG. 2 is a schematic diagram of an alternate embodiment according to the present invention, using electronic implementation.

Turning now to FIGS. 2 and 3, which are part of the same drawing, an electronic embodiment of the present invention is disclosed. As in FIG. 1, phases A, B and C of a three-phase power supply are conveyed by power lines 10, 11 and 12, respectively. A three-phase motor or other load 13 is connected through motor start/disengage contacts MS1, MS2 and MS3, which together with contacts MS4 are operated by relay driver MS. Of course, suitable solid state switching components could be used in place of relay MS. The three-phase voltages are applied through on/off switch 50 to leads 40, 41 and 42 to sequence analyzer circuits 120 and 130. Symmetrical component analyzer 120 is connected for positive sequence, and is identical to circuit 20 of FIG. 1 except for the load elements. Circuit elements 21–24 corresponds to like numbered components in circuit 20, but of course, different component values may be used if desired to achieve a required constant of proportionality. Although other types of sequence analyzers found in the prior art may be used in the circuit of FIGS. 2 and 3, the analyzer shown is preferred because of its simplicity, reliability, and low cost due to the lack of inductors. The output load of analyzer 120 comprises the resistor cascade 70–74, resistor 70 being variable for trimming purposes.

Circuit 130 is a symmetrical component analyzer connected for negative sequence, and corresponds to circuit 30 of FIG. 1. Components 31–34 correspond to like numbered components of FIG. 1, and the output load for circuit 130 is resistor cascade 75, 76 and 77.

Silicon bidirectional switches 80–83 are connected at the various junction points of resistor cascade 70–74. The other sides of each of these bidirectional switches are connected to identical resistance-capacitance-diode circutis as follows. A resistor 90 connects from bidirectional switch 80 to a lead 88, which connects to the bottom of resistor cascade 70–74. Bidirectional switch 80 also connects to the anode of a diode 91, the cathode of which connects through a capacitor 92 to lead 88, and through a current-limiting resistor 93 and a light emitting diode 94, respectively. In the same manner, bidirectional switch 81 connects through an identical resistance-capacitor-diode circuit to light emitting diode 95. Likewise, bidirectional switches 82 and 83 connect through a resistance-capacitance-diode circuits to light emitting diodes 96 and 97, respectively.

Photo resistors 104–107 are optically coupled with light emitting diodes 94–97, respectively. A direct current voltage, +V, typically five volts, from a suitable power supply (not shown) is applied to one terminal of photo resistor 104. The other side of photo resistor 104 connects through a resistor 111 to the signal ground, which is connected to the negative terminal of the power supply (not shown). The same power supply +V may conveniently be used to operate the logic elements in the remainder of the circuit. A lead 110 connects between photo resistor 104 and resistor 111. A resistor 112 connects from +V to a lead 113, which also connects through photo resistor 105 to signal ground. +V also connects through photo resistor 106 to lead 114, and from there a resistor 115 to signal ground. +v likewise connects through resistor 116 to lead 117, and from there through photo resistor 107 to ground.

The foregoing elements included within dotted line 100 comprise a voltage responsive switching means for operation in conjunction with circuit 120. Similarly, the circuitry within dotted line 140 comprises voltage responsive switching means similar to circuit 100 for use in conjunction with circuit 130. Bidirectional silicon switch 141 connects from the junction of resistors 75 and 76, and bidirectional switch 142 connects between resistors 76 and 77. The other side of each of these switches connects through a resistance-capacitance-diode network identical to components 90–93 above, to lead 143 which connects the bottom of resistor cascade 75–77, across which the output signal proportional to the symmetrical component is generated. Switch 141 connects through the resistance-capacitance-diode netword to light emitting diode 144, and switch 142 similarly connects to light emitting diode 145. These two light emitting diodes are optically coupled to photo resistors 146 and 147, respectively. +V connects through photo resistors 146 to lead 151, and also through a resistor 149 to signal ground. The voltage supply +V also connects through a resistor 148 to a lead 152, and from there through photo resistor 147 to ground.

In FIGS. 2 and 3, the circuitry within dotted line 153 generally comprises the logic and control portion of the circuit. In FIG. 2, flip-flops 154, 155 and 156 are provided. Each of these flip-flops has an $\overline{S}$ input and a $\overline{C}$ input, and Q and $\overline{Q}$ outputs. A truth table giving the operating characteristics of these flip-flop circuits is included below in the section on operation. The $\overline{S}$ input of flip-flop 154 is connected to lead 110, and the $\overline{C}$ input is connected to lead 113. The $\overline{C}$ input of flip-flop 155 is connected to lead 114, and the $\overline{S}$ input is connected to lead 117. The $\overline{C}$ input of flip-flop 156 is connected to lead 151, and the $\overline{S}$ input is connected to lead 152. The $\overline{Q}$ output of flip-flops 154, 155 and 156 are connected respectively to leads 157, 158 and 159, which continue from FIG. 2 into FIG. 3.

Also in FIG. 2, lead 41 connects to one contact of pilot control contacts 160. The other contact connects through a resistor 161 and other resistor 162 to lead 42. The anode of diode 163 is connected to the junction of resistors 161 and 162. The cathode of diode 163 connects through a capacitor 164 to lead 42, and also through a current limiting resistor 165 and a light emitting diode 166 to lead 42.

Light emitting diode 166 is optically coupled with photo resistor 170, one side of which is connected to the power supply +V. The other side of photo resistor 170 is connected to a lead 171 which continues onto FIG. 3, and also to a resistor 172, the other end of which is connected to signal ground.

As shown in FIG. 3, leads 157–159 and 171 are connected as inputs to AND gate 173. The output of AND gate 173 connects to a lead 174, which is connected to an input of AND 175, and also to resistor 176. The other end of resistor 176 connects through light emitting diode 177 to signal ground.

The output of AND gate 175 connects to resistors 181 and 182. The other end of resistor 181 connects through diode 183 to resistor 184 and capacitor 185. The other end of capacitor 185 is connected to signal ground, while the other end of resistor 184 connects through light emitting diode 186 to signal ground. The other end of resistor 182 connects through diode 187 to the input of inverter 188. The input of inverter 188 is also connected through the parallel combination of resistor 189 and capacitor 191 to ground. The output of inverter 188 is connected to the C input of flip-flop 190. A pair of resistors 192 and 193 are connected to the $\overline{S}$ input of flip-flop 190. The other end of resistor 192 connects to +V, and the other end of resistor 193 connects to signal ground. A normally open pushbotton switch 194 is connected across resistor 193. The Q input of flip-flop 190 connects through lead 195 to another of the inputs to AND gate 175.

In FIG. 3, the circuitry within dotted line 200 generally designates the residual motor voltage sensing circuit of the monitoring system of FIGS. 2 and 3. A pair of leads 201 and 202 connect to two of the power leads to motor 13. Lead 201 connects through a resistor 203 to the anode of diode 204. Also connected to the anode of diode 204 is a resistor 205, whose other end connects to lead 202. The cathode of diode 204 connects through a capacitor 206 to lead 202, and also through a current limiting resistor 207 and a light emitting diode 208 to lead 202. Light emitting diode 208 is optically coupled to a photo resistor 210, which is connected to +V. The other end of photo resistor 210 connects through resistor 211 to signal ground. The junction of resistors 210 and 211 is connected by lead 212 to the input of an inverter 213, the output of which connects through lead 214 to the remaining input of AND gate 175.

Relay driver MS which controls connection of motor 13 to the three phase power source, is connected by lead 220 to the right side of pilot control contacts 160 of FIG. 2. The other side of relay driver MS connects to a lead 221. Lead 221 connects eventually to power line 12 through one of two alternate paths. One path is through triac 222, lead 223, and contacts MS4. The other path is through triac 224, and lead 225. The firing of triac 222 is controlled by diac 226, capacitor 227, and photo resistor 228 which is optically coupled to light emitting diode 177. the firing of triac 224 is controlled by diac 230, capacitor 231, and photo resistor 232 which is optically coupled to light emitting diode 186.

Operation of the Electronic Embodiment of FIGS. 2 and 3

To energize the system, manual switch 50 is closed, thereby applying the three phase voltage to sequence analyzers 120 and 130. As is explained in greater detail in the previously referenced copending patent application, these sequence analyzers function to provide at their output terminals a voltage having a magnitude proportional to the magnitude of the positive or negative (depending upon input connection)—sequence symmetrical component of the power source. Analyzer 120 has input connections for positive sequence, and develops its output voltage across the cascade of resistors 70–74. The constant of proportionality of analyzer 120, the firing thresholds of switches 80–83, and the values of resistors 70–74 are selected so that for a normal in tolerance set of applied voltages, the output voltage developed by analyzer 120 will be great enough to fire switches 80 and 81, but not great enough to fire switches 82 and 83. The voltages conducted by switches 80 and 81 are rectified and filtered by a resistance-capacitance-diode network 90–93 and energize light emitting diodes 94 and 95.

When light emitting diode 94 is energized, the resistance of photo resistor 104 is reduced, thereby applying a voltage corresponding to a logical 1 to lead 110. However, the energization of light emitting diode 95 results in the placing of a logical 0 on lead 113, due to the fact that photo resistor 105 is connected to ground rather than to +V. Since light emitting diodes 96 and 97 are unenergized in this example, a logical 0 is applied to lead 114, and a logical 1 is applied to lead 117.

Referring to analyzer 130, which is connected to the power line for measuring negative-sequence symmetrical components, under the present assumption of acceptable input voltages, the negative-sequence symmetrical component would be ideally zero. This would result in switches 141 and 142 being in their nonconductive states, and light emitting diodes 144 and 145 being unenergized. Using positive logic, this set of circumstances results in the application of a logical 0 to lead 151 and a logical 1 to lead 152.

Any type of flip-flop circuit could be used for flip-flops 154–156, assuming suitable adjustments in the rest of the circuits were made to accomodate their operating characteristics. In the specific circuit shown in FIGS. 2 and 3, flip-flops 154, 155, 156, and 190 have operating characteristics defined by the following truth table:

| $\bar{S}$ | $\bar{C}$ | Q | $\bar{Q}$ |
|---|---|---|---|
| 0 | 0 | 1 | 1 |
| 0 | 1 | 1 | 0 |
| 1 | 0 | 0 | 1 |
| 1 | 1 | Previous State | |

For the inputs to flip-flops 154–156 developed above assuming in tolerance applied voltages, all three flip-flops will be in their reset position, and their $\bar{Q}$ outputs will be at logical 1, on leads 157–159.

Thus, assuming acceptable input voltages, three of the four inputs to AND gate 173 will be supplied with logical 1's, and the motor will be ready for starting, depending upon actuation of pilot control contacts 160. As in the embodiment of FIG. 1, the pilot control contacts may be another manual switch, or may be a pair of contacts at a remote point under the control of some process variable, such as a thermostat associated with the apparatus being operated by the motor. When contacts 160 have been closed, the voltage difference between phases B and C is applied across network 161–164, which rectifies and filters the voltage to a DC level which energizes light emitting diode 166. This in turn causes the resistance of photo resistor 170 to decrease, resulting in the application of a logical 1 to lead 171. Therefore, logical 1's are present at all inputs of AND gate 173, thereby providing a logical 1 at its output on lead 174.

One side of relay driver MS is connected to phase B by lead 220. In order to energize relay MS, its other side must be connected to phase C. It will be noted that triac 222 is not capable of starting the motor, since it connects through the latching contacts MS4. Once relay MS has been energized, thereby closing contacts MS1-4, triac 222 may be operable to maintain the motor running, but it is not capable of starting the motor. The starting path for energizing relay MS and therefore motor 13, is through triac 224 and lead 225 to power line 12. It will further be seen that energization of triac 222 is controlled by light emitting diode 177, through photo resistor 228 and diac 226. Similarly, the energization of triac 224 is controlled by light emitting diode 186, acting through photo resistor 232 and diac 230.

Assuming acceptable input voltages, and closure of the pilot control contacts as explained above, a logical 1 is developed on lead 174, which energizes light emitting diode 177. However, as explained above, this is sufficient to maintain the motor in a running condition if already running, but it is not sufficient to start the motor. Starting of the motor must be accomplished through the lockout counter subcircuit, which comprises AND gate 175, flip-flop 190, light emitting diode 186, and associated circuitry.

Assume for the moment that all three of the inputs to AND gate 175 are logical 1's, thereby producing a logical 1 at its output. Capacitors 185 and 191 immediately begin to charge, their rates of charging being determined by their capacitances, and the value of resistors 181 and 182, respectively. The circuit values are chosen so that, assuming both capacitors start from zero initial charge, capacitor 185 will charge fast enough to energize light emitting diode 186 before the voltage across capacitor 191 has built up enough to trip inverter 188 to clear flip-flop 190. Energization of light emitting diode 186 turns on triac 224, pulling in relay starter MS thereby starting motor 13. Closing of latching contact MS4 enables triac 222 which also turns on, because of the previous energization of diode 177. As soon as power is applied to the motor, the residual motor voltage sensor applies a logical 0 to AND gate 175 on lead 214, thus inhibiting gate 175 to prevent further voltage buildup on capacitor 191.

If successive restart attempts are made in a short time interval, due to some fault condition, the lockout counter will lock the starting circuit out to prevent damage to the motor. In such a case, there will be an initial voltage on capacitor 191 at the time AND gate 171 switches its output to a logical 1 to start, because the charge built-up during the previous start cycle has not had sufficient time to discharge through resistor 189 to ground. On the other hand, capacitor 185 will have discharged to ground through diode 186 and will be starting with practically no initial voltage. Accordingly, the voltage on the capacitor 191 may reach sufficient magnitude to clear flip-flop 190 before sufficient voltage has built-up on capacitor 185 to turn on diode 186. When this happens, the Q output of flip-flop 190 goes to a logical 0, which inhibits AND gate 175, removing the logical 1 from its output. With gate 175 thus inhibited, the starting circuit is effectively locked out and the motor will be unable to restart until manual switch 194 is closed, applying a logical 0 to the $\bar{S}$ input to set flip-flop 190. The number of restarts allowable within in a certain time period can be selected by appropriate selection of the charging and discharging time constants in the circuit. The operational effect of the lockout counter is thus identical to the terminal lockout counter of FIG. 1, although different implementation is used.

The charging of capacitor 185 under normal starting conditions provides a starting delay which may be adjusted as desired relative to the operation of the lockout counter, and also to provide a starting time delay for sequential starting of multiple motors on a common branch circuit after applied voltage conditions return to normal following a fault.

The residual motor voltage sensing circuit 200 operates as follows. The network comprising elements 203–206 comprise a rectifier and filer for rectifying the AC voltage between two inputs of motor 13, and for providing therefrom a DC voltage to operate light emitting diode 208. When a start attempt is made, if motor 13 either has stopped rotating, or is rotating so slowly as to produce negligible residual voltage, diode 208 will be off, putting a logical 0 on lead 212, and a logical 1 on lead 214, thereby enabling AND gate 175 to proceed with the starting sequence, however, if a disconnect has occurred just prior to a start attempt, motor 13 may still be rotating because of inertia, and producing a residual voltage which will turn on diode 208. This in turn will cause a logical 1 at lead 212 and a logical 0 at lead 214, thus inhibiting the starting cycle until the motor 13 has slowed down to safe levels. Thus the motor is protected from damage which might otherwise result from re-engagement to the power line which might otherwise result from re-engagement to the power line with a probable phasing mismatch between the residual voltage of the motor and the voltage of the power line.

Once the motor 13, or other load, is connected and operating, if an out of tolerance voltage condition should occur, one or more of flip-flops 154–156 will be set, thereby causing disconnection of the motor. Flip-flop 154 and the circuitry associated with switches 80 and 81 guard against an undervoltage condition. Assume, for example, that a general decrease in the applied voltages from lines 10, 11 and 12 occurs, such as in a "brownout." This general reduction of voltage leads to a corresponding reduction in the voltage developed across resistors 70–74, the magnitude of which is proportional to the magnitude of the positive-sequence-symmetrical component. When this voltage drops to a predetermined threshold determined in consideration of the safe operating parameters of motor 13, and selected by choice of the proportionality constant of the analyzer circuit, the following sequence of events occurs. As the voltage begins to drop, switch 81 becomes nonconductive, placing a logical 1 at the $\overline{C}$ input flip-flop 154, but the flip-flop does not change states. As the voltage drops further to the critical threshold, switch 80 ceases to conduct, placing a logical 0 at the $\overline{S}$ input of flip-flop 154 after an appropriate time delay determined by the discharge time constant of capacitor 92 and resistor 93. This causes the flip-flop to change state, placing a logical 0 at its $\overline{Q}$ output, which inhibits AND gate 173 and causes disconnection of the motor. The time delay is typically chosen between 0.5 and 5 seconds to prevent nuisance tripping that could be caused by momentary voltage drops.

If the voltage begins to increase again, switch 80 will begin to conduct thereby placing a logical 1 on the $\overline{S}$ input to flip-flop 154. However, this does not cause the flip-flop to change states. With logical 1's on both inputs, the flip-flop remains in its previous state which was a set condition with a logical 0 on the $\overline{Q}$ output. The flip-flop will not change states until the voltage has increased beyond the point necessary to fire switch 80, to the higher voltage necessary to fires switch 81. At that point a logical 0 is placed on the $\overline{C}$ input to flip-flop 154, causing it to switch to a reset condition and place a logical 1 on the $\overline{Q}$ output. At that point, assuming there is no motor residual voltage, and that the counter lockout has not locked out, the motor will be re-engaged after a predetermined time delay.

Thus, it will be seen that through selection of the voltage divider network 70–74, switch 80 determines the lower voltage at which the motor is disengaged, while 81 determines the slightly higher voltage at which restart will occur, thereby providing a built-in hysteresis to prevent control cycling or pumping. This same result could be achieved by using a properly designed Schmidt trigger.

In the case of an overvoltage condition, first switch 82 and then switch 83 would begin to conduct. When switch 83 fires, flip-flop 155 changes state after an appropriate time delay determined by the capacitation changing circuit, causing disengagement of the motor. When the overvoltage condition subsides switch 83 will cease conducting, but the flip-flop will not be reset until the voltage drops low enough to turn off switch 82. Switch 82 and associated circuitry therefore provides another built-in hysteresis effect.

Assume that an unbalanced condition occurred, or that one of the phases went dead. If the motor were unprotected, this could result in drawing excessive currents from the other two phases, which would lead to overheating. The out of balance voltages, however, result in a nonzero negative-sequence symmetrical component, which is detected by analyzer circuit 130. When the voltage developed by this circuit becomes excessive, as determined by the characteristics of motor 13, and designed into the proportionality constant of circuit 130, switch 141 and then switch 142 begin to conduct. When switch 142 fires, flip-flop 156 changes state after an appropriate time delay determined by the capacitor changing circuit to disengage the motor. This time delay is preferably set at about 0.5 to 1.0 seconds. Another hysteresis effect is built-in so that the flip-flop will not be reset until the negative-sequence voltage drops low enough to turn off switch 141.

In the case of the incorrect phasing, if leads 10, 11 and 12 were somehow interchanged, or under certain fault conditions with capacitor bank power factor correction, an extremely high negative-sequence component would be produced. This would cause a very large voltage to appear across resistors 75–77. Switches 141–142 would fire setting flip-flop 156 to disengage the motor. Voltage protecting device 78, which is connected from the junction of resistors 75 and 76 to lead 143, would limit the voltage across the switching circuits to protect them from burning out.

It will be seen that the occurrence of any of these out-of-tolerance conditions results in turning off AND gate 173, which de-energizes diode 177, thereby causing de-energization of relay MS and disconnection of the motor. When the offending condition has returned to within safe margins plus the hysteresis value, AND gate 173 is turned on again, thereby enabling AND gate 175 to initiate the starting sequence, subject to possible limitations imposed by the residual motor voltage detector or the lockout counter, both of which were discussed above.

The embodiment of FIGS. 2 and 3 can alternatively be connected to sense the voltages on the motor side of the MS contacts. An alternate circuit would have to be provided to apply voltages to the sensors to permit initial starting. Such a connection would permit the monitor circuit to additionally monitor the operation of the contacts.

Although specific relay logic and electronic embodiments of the present invention are disclosed, other equivalent circuits and electronic devices can be used to realize monitoring systems according to the present invention. The motor protection circuit and automatic restart control system of the present invention provides complete motor or other load protection against a wide range of harmful input voltage variations. Through the use of highly efficient but low cost symmetrical component sequence analyzers, potentially harmful voltage conditions which might escape other types of input voltage sensing means are detected, independent of the phase or combination of phases on which they occur. Hysteresis is built into the circuit to provide a safety margin before the motor is reconnected. Residual motor voltage protection circuits and a restart counter lockout provide a safety margin before the motor is reconnected. Residual motor voltage protection circuits and a restart counter lockout provide further protection to the load. Time delays are provided to prevent nuisance tripping. Finally, the entire monitoring system lends itself to low cost production so as to make high performance motor protection widely available where it has not heretofore been economically feasible.

We claim:

1. A monitoring system for controlling the state of connection of an electrical load to a three-phase electrical power source, comprising:
   a. sequence analyzer means for measuring a symmetrical component of input voltages applied thereto;
   b. input means for connecting said sequence analyzer means to the power source;
   c. line switching means for controlling the connection of the load to the three-phase power source;
   d. control means connected to said line switching means and said sequence analyzer means, said control means for causing disconnection of the load from the power source when the magnitude of the symmetrical component varies from a predetermined acceptable range of values and for causing reconnection of the load when the symmetrical component magnitude returns within the acceptable range;
   e. residual voltage sensing means connected to the load for sensing residual voltages thereat; and
   f. means connecting said residual voltage sensing means to said control means for inhibiting said control means from reconnecting the load to the power source if the residual voltage exceeds a predetermined value.

2. A monitoring system according to claim 1, wherein said residual voltage sensing means comprises a relay having a driver connected to a pair of inputs to the load and having a pair of contacts connected to said control means so as to prevent engagement of the load to the power source if the relay is energized.

3. A monitoring system according to claim 1, wherein said residual voltage sensing means comprises rectification means connected to said load for providing a DC voltage indicative of the load voltage and logic means connected to said control means for preventing reconnection of the load to the power supply if the load voltage exceeds a predetermined level.

4. A monitoring system for automatically controlling the connection, disengagement and reconnection of a three-phase electrical load to a power source, comprising:
   a. sequence analyzer means for measuring a symmetrical component of input voltages applied thereto;
   b. input means for connecting said sequence analyzer means to the power source;
   c. line switching means for controlling the connection of the load to the three-phase power source;
   d. control means connected to said line switching means and said sequence analyzer means, said control means for causing disconnection of the load from the power source when the magnitude of the symmetrical component varies from a predetermined acceptable range of values for a sufficient period of time and for causing reconnection of the load if the symmetrical component magnitude returns to the acceptable range;
   e. first time delay means connected to said control means for delaying the connection of the load to the power source for a predetermined time period;
   f. integrating delay means connected to said control means for activation when a connection of the load to the power source is to be made, said integrating delay means having energization and de-energization time constants greater than the energizing and de-energizing time delays of said first time delay means; and
   g. lockout means connected to said control means and to said integrating delay means, said lockout means operable to inhibit said control means from causing connection of the load to the power source when said integrating delay means has reached a predetermined level of energization, whereby reconnection of the load is prevented when an excessive number of restart attempts have been made in a given time interval.

5. A monitoring system according to claim 4, wherein said integrating delay means comprises a thermally insulated time delay relay.

6. A monitoring system according to claim 4, wherein said integrating delay means comprises a resistance-capacitance charging and discharging circuit.

7. A monitoring system for a three-phase electrical power for providing automatic disconnection of a motor from the source in the event of unacceptable power source voltages and automatic restart of the motor when the power source voltages return within tolerance, comprising:
   a. first and second sequence analyzer circuits for providing output voltages having a magnitude proportional to the magnitude of a symmetrical component of three-phase voltages applied thereto;
   b. means for connecting said three-phase electrical power source to said first sequence analyzer circuit for measurement of the positive sequence symmetrical component;
   c. means for connecting said three-phase electrical power source to said second sequence analyzer circuit for measurement of the negative sequence symmetrical component;
   d. voltage responsive switching means connected to receive the output voltages of said first and second sequence analyzers, said voltage responsive switching means for providing control signals indicative of whether the magnitudes of the positive and negative sequence symmetrical components of said three-phase power source are within predetermined tolerances;
   e. line switching means for controlling the connection of the motor to the three-phase power source;
   f. logic means connected to said voltage responsive switching means and to said line switching means, said logic means for causing said line switching means to disconnect the motor when said control signals indicate an out-of-tolerance condition, and for causing said line switching means to connect the motor to the three-phase power source when said control signals indicate an in tolerance condition;
   g. residual voltage sensing means connected to the motor and to the logic means for inhibiting the logic means from causing reconnection of the motor to the power source if the residual voltage at the motor exceeds a predetermined value; and
   h. lockout means connected to said logic means for preventing connection of the motor to the power source when a predetermined number of restart attempts have been made in a given time interval.

8. A monitoring system according to claim 7 and further including hysteresis means connected to said voltage responsive switching means and operable in response thereto to change the voltage tolerances required for reconnection after a disconnection of the motor has occurred.

9. A monitoring system according to claim 7 wherein said residual voltage sensing means comprises a relay having a driver connected to a pair of inputs to the motor and having a pair of contacts connected to said logic means.

10. A monitoring system according to claim 7 wherein said residual voltage sensing means comprises rectification means connected to said motor for providing a DC voltage indicative of the motor voltage and a voltage responsive switch connected to said rectification means and to said logic means.

11. A monitoring system according to claim 7 wherein said lockout means comprises:
   a. first time delay means connected to said logic means for delaying the connection of the motor to the power source for a predetermined time period;
   b. integrating time delay means connected to said logic means for activation when a connection of the motor to the power source is to be made, said integrating delay means having energization and de-energization time constants greater than the energizing and de-energizing time delays of said first time delay means; and
   c. switching means connected to said logic means and to said integrating time delay means for inhibiting said logic means from causing connection of the load to the power source when said integrating delay means has reached a predetermined level of energization.

12. A monitoring system according to claim 11 wherein said integrating delay means comprises a thermally insulated time delay relay, and wherein said switching means comprises a stepping relay.

13. A monitoring system according to claim 11, wherein said integrating delay means comprises a resistance-capacitance charging and discharging circuit, and wherein said switching means comprises a flip-flop circuit.

* * * * *